United States Patent [19]

Hancock

[11] Patent Number: 4,738,154
[45] Date of Patent: Apr. 19, 1988

[54] VEHICLE STEERING COLUMN

[75] Inventor: Michael T. Hancock, Coventry, England

[73] Assignee: The Torrington Company, Torrington, Conn.

[21] Appl. No.: 21,090

[22] Filed: Mar. 3, 1987

[30] Foreign Application Priority Data

Mar. 4, 1986 [GB] United Kingdom ............... 8605310

[51] Int. Cl.⁴ .................. B62D 1/16; B60R 25/02; B23P 11/00
[52] U.S. Cl. .................................. 74/492; 29/516; 70/252
[58] Field of Search ............... 74/492; 29/516; 70/252

[56] References Cited

U.S. PATENT DOCUMENTS

| | | | |
|---|---|---|---|
| 2,102,325 | 12/1937 | Kylstra | 29/516 X |
| 3,613,412 | 10/1971 | Yamaguchi | 70/252 |
| 3,835,725 | 9/1974 | Furusho et al. | 70/252 X |
| 4,601,215 | 7/1986 | Barnabe et al. | 74/492 |

FOREIGN PATENT DOCUMENTS

| | | | |
|---|---|---|---|
| 129522 | 12/1984 | European Pat. Off. | 70/252 |
| 3419537 | 11/1985 | Fed. Rep. of Germany | 74/492 |
| 211945 | 12/1983 | Japan | 70/252 |
| 61349 | 4/1985 | Japan | 70/252 |

Primary Examiner—Allan D. Herrmann
Attorney, Agent, or Firm—Frank S. Troidl

[57] ABSTRACT

A steering column for a vehicle and a method of making same, wherein the steering column is made from a tube which has a sleeve passed over a length of it in the region where the steering column is to be engaged by a steering lock mechanism, in order for there to be sufficient thickness in that region to accommodate a lock slot of the steering lock mechanism.

In order to achieve substantially the same overall outer diameter along the major length of the steering column, the sleeve is secured to the tube, for example, by welding and the sleeve and underlying tube are crushed by swaging or a die forming machine so that the outer diameter of the sleeve becomes substantially the same as that of the tube beyond the sleeve.

19 Claims, 1 Drawing Sheet

VEHICLE STEERING COLUMN

This invention relates to a steering column for a vehicle.

A steering lock for a steering column of a vehicle can include a steering lock mechanism which is engageable in a longitudinally-extending lock slot formed in the steering column.

Hitherto, it has been common practice to use solid bar for the steering column and to machine the lock slot in the solid bar. However, this has its disadvantages, in that the solid bar is heavy and can cause vibrational problems resulting in steering wheel shake.

Accordingly, it has been proposed to replace the bar by tube but if, for example, the tube is 3 mm thick, which would be a normally acceptable thickness, any lock slot made in the tube will go right through it and the tube will not then meet the required engineering tests and requirements. Another requirement that has to be met is that the outer diameter of the steering column should be substantially constant along the major part of its length, or at least should not exceed a certain diameter.

According to one aspect of the present invention, there is provided a steering column for a vehicle, the steering column being tubular and incorporating part of a steering lock means, said part comprising a sleeve fitted to the tube around the outside of part of the length of the tube and having a slot in it into which another part of the steering lock means can engage, and the outer diameter of the sleeve and the outer diameter of the tube beyond the sleeve being substantially the same as one another.

According to another aspect of the present invention, there is provided a method of making a steering column for a vehicle and including the steps of forming the steering column from tube, fitting a sleeve about part of the length of the tube, causing the outer diameter of the sleeve and the outer diameter of the tube beyond the sleeve to be substantially the same as one another and forming a slot in the sleeve to constitute part of a steering lock means.

One or both ends of the sleeve can be welded to the tube.

With or without the welding, knurling or serrations can be formed on the tube in the region which is to lie beneath the sleeve.

The outer diameters of the tube and sleeve may be caused to be substantially the same by a swaging operation. Alternatively, this may be achieved by using a solid die forming machine.

Preferably, the lock slot extends longitudinally of the sleeve and passes right through it. The lock slot may also pass into at least part of the tube. The slot may be formed by machining with a cutter.

Preferably, the tube is about 3 mm thick and the sleeve is about 2 mm thick before its diameter is reduced. After reduction, its thickness becomes about 3 mm thick, so as to give a substantially 6 mm thickness overall in the region of the sleeve and tube.

For a better understanding of the invention and to show how the same may be carried into effect, reference will now be made, by way of example, to the accompanying drawings, in which.

Figure 1:
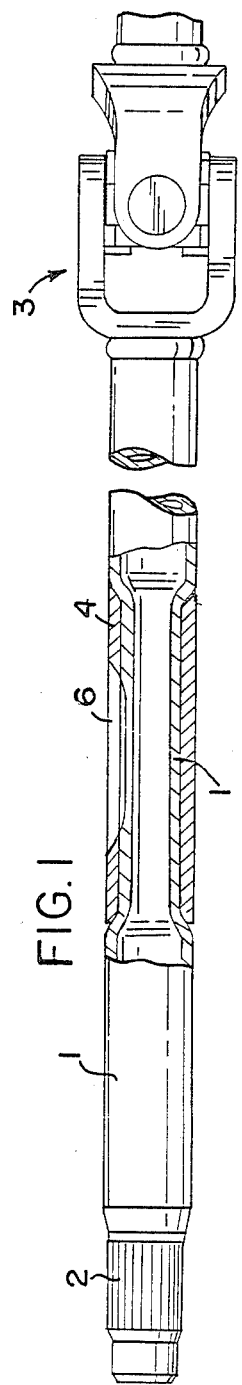
FIG. 1 is a side view, partly in section, through part of a steering column for a vehicle.
Figure 2:
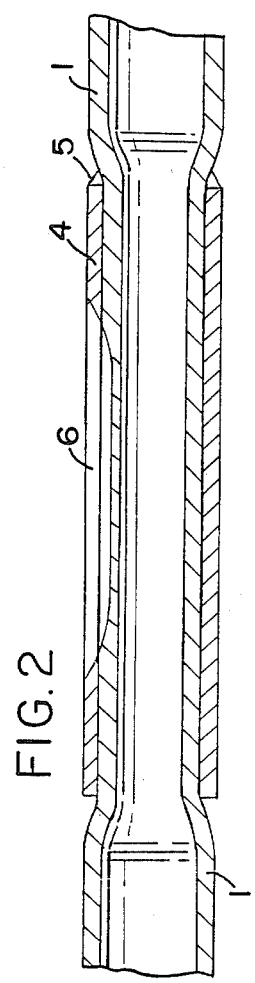
FIG. 2 is an enlarged view of a part of the steering column shown in FIG. 1.
Figure 3:
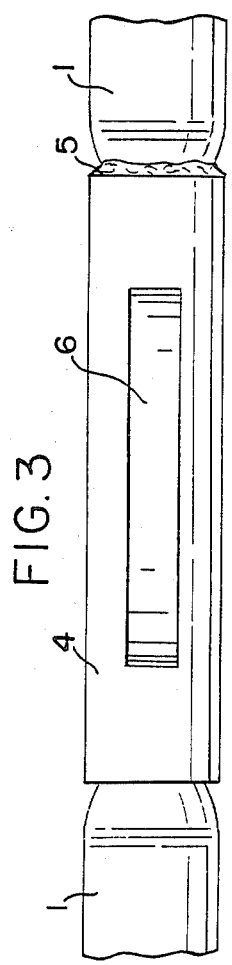
FIG. 3 is a plan view of the part shown in FIG. 2.

Referring to the drawings, the part of the steering column shown includes a tube 1 with a splined end 2 and a universal joint 3 at its other end.

An outer sleeve 4 is passed over the tube 1, the inner diameter of the sleeve 4 being substantially the same as the overall outer diameter of the tube 1. One end of the sleeve 4 is welded at 5 to the adjacent tube 1 around its circumference.

Either a swaging or solid die forming machine is then used to reduce the diameter of the sleeve 4 over the tube 1 and this increases the steering shaft thickness locally.

In other words, the welded sleeve 4 and tube 1 are machined as if the whole were solid, the sleeve 4 being held by the weld, which is also crushed. It is also possible for the weld to be applied to both ends of the sleeve 4.

Instead of or as well as the welding, knurling or serrations can be applied to the other surface of the tube 1 in the region which is to lie under the sleeve 4. This, too, may assist in securing the sleeve 4 during the reducing operation. The sleeve 4 can be a loose or a tight fit on the knurling or serrations before crushing and the knurling or serrations can extend over a length corresponding to the actual length of the sleeve 4.

In the example illustrated, before working the overall outer diameter of the tube 1 is about 22 mm and is about 3 mm thick and the sleeve 4 before reducing is formed of tube about 2 mm thick.

Once the sleeve 4 has been squashed into the tube 1, the outer diameter of the sleeve 4 is also about 22 mm, which is the same as the outer diameter of the tube 1 beyond the sleeve 4. In the region of the sleeve 4, the tube 1 is caused to collapse and the sleeve 4 is caused to thicken by the die forming or swaging process and an effective overall 6 mm thickness or thereabouts of tube is achieved in this region.

The resultant product then has a longitudinally-extending slot 6 formed in it, preferably by using a cutting machine. The slot 6 may be at least 25 mm long and may extend right through the wall of the sleeve 4 and at least partly into the adjacent wall of the tube 1 so as to have a maximum depth of about 4 or 5 mm.

It will be appreciated that, by welding or otherwise securing the sleeve 4 on the tube 1, the reduction of the sleeve 4 over the tube 1 can be carried out in a single operation. Furthermore, by forming the lock slot as described, the engineering requirements for steering columns are met, whilst reducing steering column weight and inhibiting vibrational problems.

I claim:

1. A steering column for a vehicle, comprising a tube, a sleeve fitted to the tube around the outside of part of the length of the tube and having a slot in it and the outer diameter of the sleeve and the outer diameter of the tube beyond the sleeve being substantially the same.

2. A steering column according to claim 1, wherein at least one end of said sleeve is welded to said tube.

3. A steering column according to claim 2, wherein the welding extends around the circumference of said tube.

4. A steering column according to claim 1, wherein said slot extends right rough said sleeve.

5. A steering column according to claim 4, wherein said slot extends also into the adjacent tube.

6. A steering column according to claim 1, wherein said outer diameter of said sleeve is substantially 22 mm.

7. A steering column according to claim 1, wherein said tube beyond said sleeve is substantially 3 mm thick.

8. A steering column according to claim 1, wherein the combined thicknesses of said sleeve and said tube therebeneath is substantially 6 mm.

9. A steering column according to claim 8, wherein said slot has a maximum depth of between 4 and 5 mm.

10. A method of making a steering column for a vehicle including the steps of forming the steering column from tube, fitting a sleeve about part of the length of the tube, causing the outer diameter of the sleeve and the outer diameter of the tube beyond the sleeve to be substantially the same and forming a slot in the sleeve.

11. A method according to claim 10, wherein said sleeve is caused to have a substantially common outside diameter with said tube that lies beyond said sleeve by swaging the sleeve on the tube.

12. A method according to claim 10, wherein said sleeve is caused to have a substantially common diameter with said tube that lies beyond said sleeve by performing a solid die forming operation on the sleeve and tube.

13. A method according to claim 11, wherein said tube is caused to collapse partially inwardly of said sleeve upon swaging and said sleeve concurrently gains in thickness.

14. A method according to claim 12, wherein said tube is caused to collapse partially inwardly of said sleeve upon die forming and said sleeve concurrently gains in thickness.

15. A method according to claim 10, wherein said slot is machined in the outside of said sleeve along part of its length.

16. A method according to claim 15, wherein said slot is caused to extend right through the thickness of said sleeve.

17. A method according to claim 16, wherein said slot is caused to extend partly into the material of said tube beneath said sleeve.

18. A method according to claim 10, wherein said tube, prior to operations, is substantially 22 mm in diameter and has substantially a 3 mm thickness and wherein said sleeve, prior to operations, has a substantially 2 mm thickness with an inner diameter of substantially 22 mm.

19. A method according to claim 10, wherein the combined thickness of said sleeve and tube beneath it, after causing the outer diameter of the sleeve to have a common diameter with the tube beyond the sleeve, is substantially 6 mm.

* * * * *